Jan. 16, 1945.  C. M. OSTERHELD  2,367,368
ELECTRIC TANK HEATER
Filed Dec. 21, 1942  3 Sheets-Sheet 1
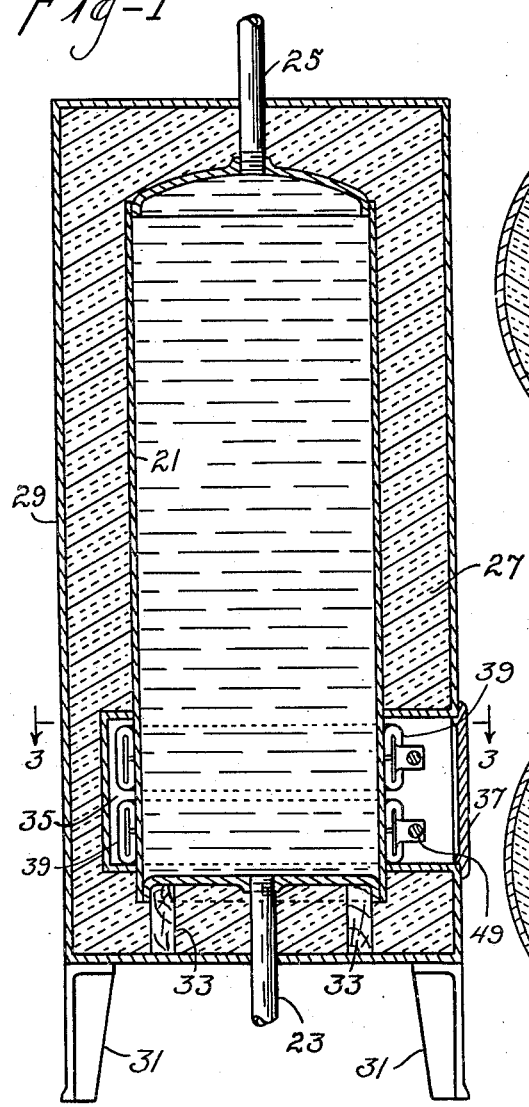
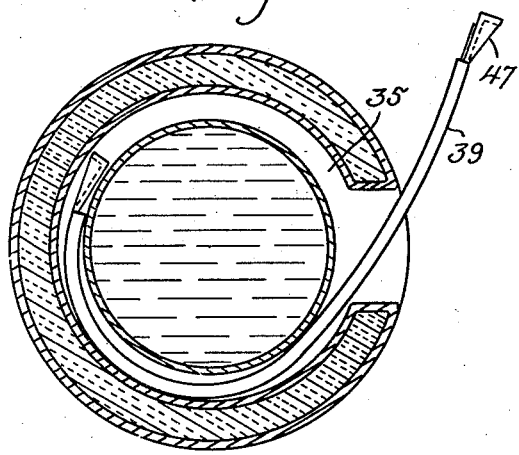
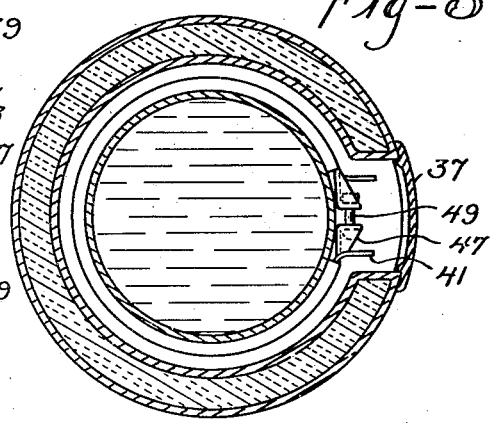
INVENTOR.
CLARK M. OSTERHELD
BY
ATTORNEY

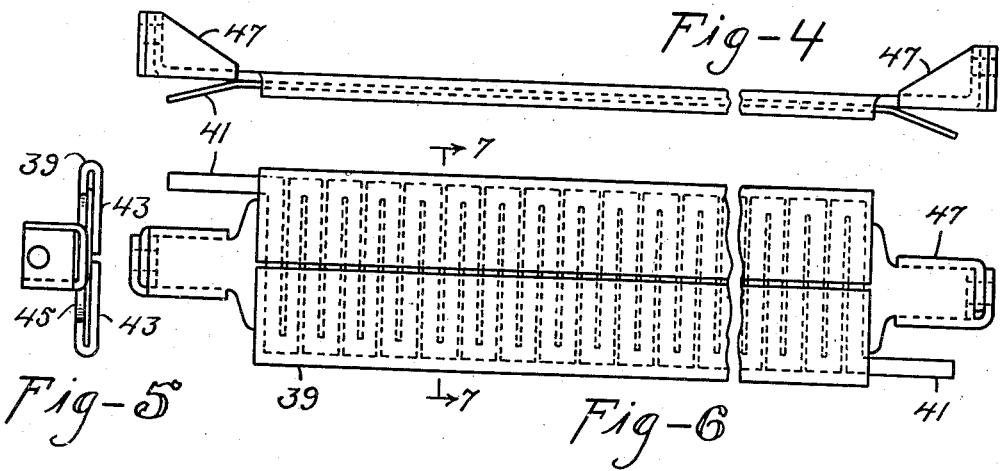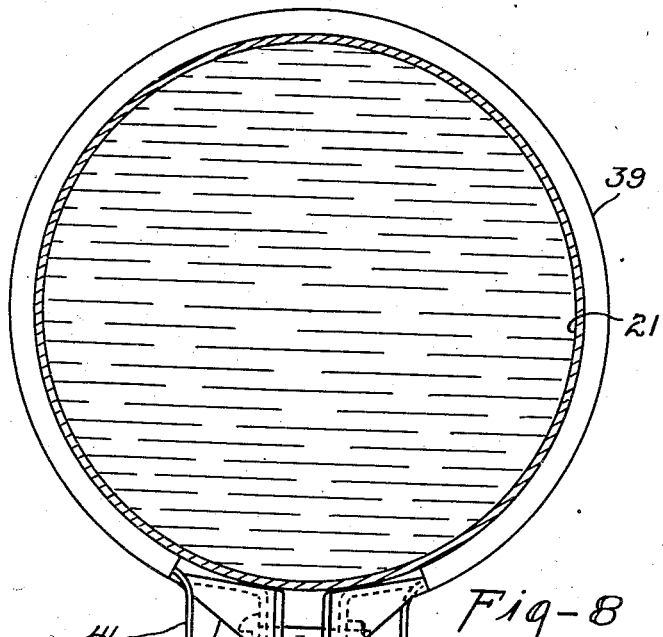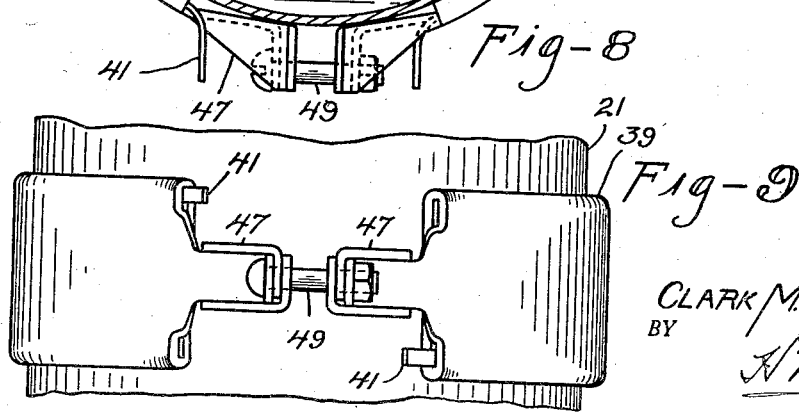

Jan. 16, 1945.    C. M. OSTERHELD    2,367,368
ELECTRIC TANK HEATER
Filed Dec. 21, 1942    3 Sheets-Sheet 3
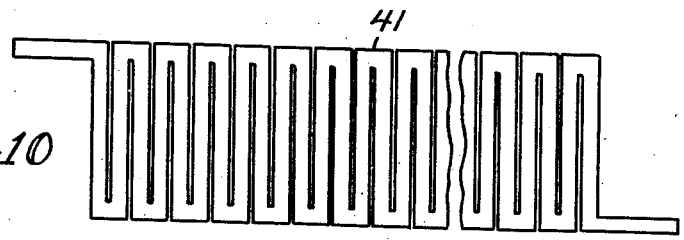
Fig-10
Fig-11
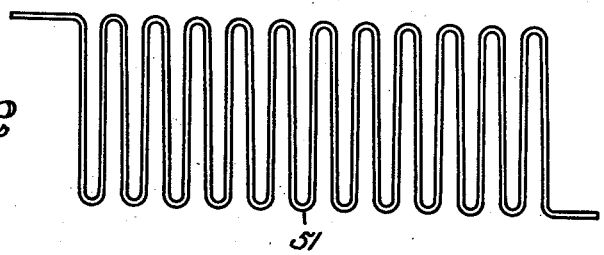
Fig-12
Fig-13
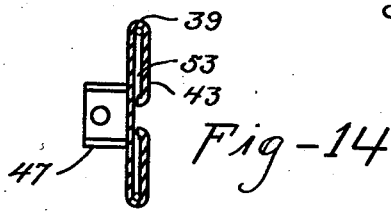
Fig-14
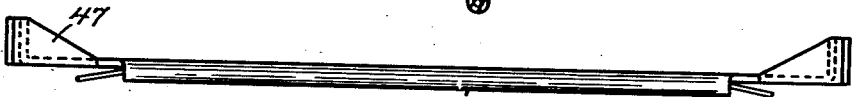
Fig-15
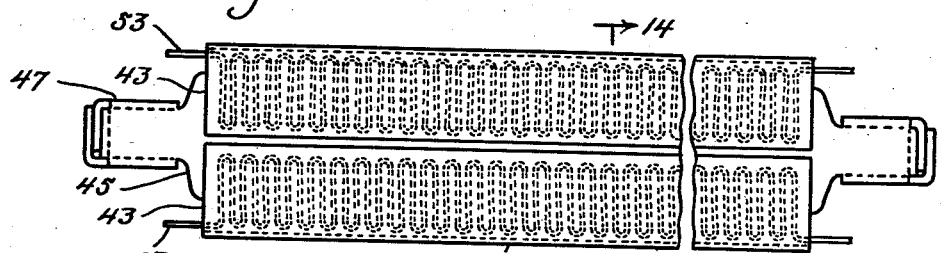
Fig-16
INVENTOR.
CLARK M. OSTERHELD
BY
ATTORNEY Patented Jan. 16, 1945

2,367,368

UNITED STATES PATENT OFFICE 2,367,368

ELECTRIC TANK HEATER

Clark M. Osterheld, Stoughton, Wis., assignor to McGraw Electric Company, Elgin, Ill., a corporation of Delaware Application December 21, 1942, Serial No. 469,664

4 Claims. (Cl. 219—38)

My invention relates to hot water tanks and particularly to electric heating units therefor.

An object of my invention is to provide a novel, relatively simple, inexpensive and highly efficient electric heating unit for an ordinary domestic hot water tank.

Another object of my invention is to provide a tank water heater which shall embody a minimum number of parts, which has a highly efficient and very thin electric-insulating coating on one of its elements to insulate the resistance conductor from the tank and that shall be easily and quickly removed therefrom and reinserted in its proper operative position.

Other objects of my invention will either be apparent from a description of one form of device embodying my invention and now preferred by me or will be pointed out in the course of such description and set forth particularly in the appended claims.

In the drawings,

Figure 1 is a vertical sectional view through a water tank having mounted thereon an electric heating unit embodying my invention, Fig. 2 is a horizontal sectional view therethrough taken on the line 3—3 of Fig. 1 showing the method of inserting and removing my improved heating unit, Fig. 3 is a view similar to Fig. 2 but showing the heating unit in its proper operative position on the tank, Fig. 4 is a view in side elevation of one form of my improved electric heating unit, Fig. 5 is an end view thereof, Fig. 6 is a top plan view of one form of my improved heating unit, Fig. 7 is a cross-sectional view on the line 7—7 of Fig. 6, Fig. 8 is a sectional view, on a larger scale than that used in Fig. 3, and showing the heating unit of Fig. 6 attached to and mounted on a domestic hot water tank, Fig. 9 is a front view of Fig. 8, Fig. 10 is a top plan view showing another form of resistor element, Fig. 11 is an end view thereof, Fig. 12 is a top plan view of another form of resistance conductor used in my novel heating element, Fig. 13 is an end view thereof, Fig. 14 is a sectional view through another form of heating unit embodying my invention and taken on the line 14—14 of Fig. 16, Fig. 15 is a view in side elevation of the assembly shown in Fig. 16, and, Fig. 16 is a top plan view of the heating unit shown in Figs. 14 and 15.

Referring first of all to Fig. 1 of the drawings, I have there shown an ordinary hot water tank 21 as of circular shape, to illustrate how the electric heating unit embodying my invention may be cooperatively associated therewith. The tank 21 is provided with a lower cold water inlet pipe 23 and an upper hot water outlet pipe 25. The tank 21 may have mounted thereon a mass of heat insulation 27 which may be protected by an outer casing 29, all in a manner well known in the art. The tank may be supported by legs 31 and be spaced from the bottom member of casing 29 by spacing blocks 33, all in a manner now well known in the art.

I provide a tunnel member 35 of desired size around the tank 21 near the lower end thereof and for reasons which will presently appear, the tunnel is made open at one point or portion thereof which may be normally closed by a cover 37.

Referring now to Figs. 4, 5 and 6, I have there shown, particularly in Fig. 6 of the drawings, an electric heating unit comprising a sheath 39 and a single layer flat resistance conductor 41 positioned within the sheath 39. The member 39 may be made of a relatively thin sheet of suitable metal or metal alloy and at present I prefer to use aluminum sheet having a thickness of say on the order of .015". The edge portions 43 of the initially flat strip 39 are bent over first to substantially channel shape to permit of locating within the channel member thus formed the flat extended resistance conductor 41 after which the edge portions 43 are bent down into substantial parallelism with the intermediate portion 45 of the strip 39 to thereby cause good heat-conducting engagement between the resistance conductor 41 and the surfaces of the sheath 39 engaging therewith. As has been stated above, I prefer to make the sheath 39 of aluminum and I may provide thereon a so-called anodic coating which has the characteristics of being integral with the surface of the material on which it is formed, coherent therewith, is inorganic, is heat-conducting, high temperature-resisting and what is of particular importance in my use thereof, is electric-insulating. While aluminum has formed thereon, when in contact with air, an oxide coating, this is not the type of anodic coating which I use in the device embodying my invention. Such coating may be formed on the strip 39 either by electrolytic action or by merely immersing the aluminum article in a suitable solution, all in a manner well known in the art. For illustrative purposes I may mention that the thickness of such an anodic coating on aluminum may be on the order of .0004" but it may also be greater. In any case, however, it is very thin and when properly produced it has another important characteristic, namely, that it is possible to change the shape of the aluminum article on which it is formed to a great extent without cracking, flaking or loosening of such a coating.

I have shown in Figs. 10 and 11 the resistance conductor 41 as being made of an initially flat strip of a suitable resistance material, which may be Nichrome, but I may also use a strip of aluminum or of aluminum alloy of suitable width and thickness. The initially flat strip is then provided with laterally-extending slits or narrow slots, the alternate slots extending to opposite edges of the strip and it is obvious that any desired ohmic resistance may be provided for the resistance conductor 41 by suitable selection of the width and thickness of the strip and the number, the spacing, and the width of the lateral slots, all as now well known in the art.

If the heating unit embodying the resistance conductor 41 is to be called upon to withstand a relatively high breakdown voltage and if the resistance conductor 41 is of aluminum, I may provide the above described anodic coating for the entire surface of the resistance conductor 41 so that there will be a plurality of the electric-insulating coatings in series circuit relation with each other to prevent breakdown thereof and consequent grounding of the resistance conductor on the tank 21.

Referring now to Figs. 7, 8 and 9, I have there illustrated the mounting of the heating unit embodying members 39 and 41 associated as above described and clamped around the tank. For this purpose I provide lugs 47 one for each end of the sheath 39, these clamping lugs comprising particularly bent-out portions of the sheath having an opening therein to receive a clamping bolt 49 by means of which a tension may be applied to the housing or sheath 39. It is to be noted that the lugs 47 extend laterally away from the plane of member 39 in a direction opposite to that in which edge portions 43 are located so that when the housing or sheath 39 is mounted into tight or close heat-conducting engagement with the outer surface of the tank 21, the edge portions 43 of the flattened heating unit will be in engagement with the outer surface of the tank 21.

This has the effect that as the tension is applied to the intermediate portion 45 of the sheath 39 by means of the clamping bolt 49, the edge portions 43 will be pressed into good heat-conducting engagement with the outer surface of the tank by reason of the tension applied to the elongated intermediate portion 45 acting through the resistance conductor 41, as will be apparent from a consideration of the assembly drawings.

While I have not shown any particular terminal members or supply circuit conductors for my improved heating unit, it is of course obvious that any desired construction for such purpose may be applied.

Referring now to Fig. 2 of the drawings, I have there shown the heating unit 39 with the resistance conductor 41 associated therewith as described above while it is being moved into a tunnel 35 and it is obvious that it is necessary only to start one end of the heating unit in the opening provided in the tunnel and normally covered by cover member 37, it being obvious that the flexibility of the elongated heating unit will be sufficient to permit of causing the heating unit to move around the tank until the two ends can be positioned substantially as shown in Fig. 3 of the drawings and a clamping bolt 49 applied to the lugs 47.

Referring now to Figs. 12 and 13, I have there illustrated another form of resistance conductor 51 which I may use and it is to be noted that this includes a resistance conductor of wire shape or in fact of any strand-like form, and which comprises a plurality of integral and substantially parallel convolutions extending laterally of the length of the heating unit. The resistance conductor 51 may be used in place of resistance conductor 41 above described. While the resistance conductor 51 may be made of any suitable metallic resistor material such as Nichrome, I may make it of aluminum and provide an anodic coating having the above described characteristics on the surface of the conductor 51. In all respects the same comments as made hereinbefore with regard to housing 39 and resistance conductor 41 will apply if resistance conductor 51 is placed in sheath or housing 39.

Referring now to Figs. 14 to 16 inclusive, I have there shown a sheath or housing 39 comprising an initially flat strip of preferably aluminum and having thereon the above described anodic coating. Instead of a convoluted resistance conductor extending across the entire width of the flattened housing or sheath 39, I may provide a resistance conductor 53 which is of substantially the same shape as resistance conductor 51 but is slightly less than one-half of the lateral width of resistance conductor 51. This will permit of connecting two end portions of the two conductors 53 at one end of the heating unit if desired or necessary although it is evident that even where resistance conductors 41 or 51 are used, the end portions of the resistance conductor will be located relatively close together and within the opening of the tunnel member 35.

The same comments apply to the form of Figs. 14 to 16 inclusive as regards the direction in which the lugs 47 extend so that the bent-over edge portions 43 of the sheath or housing will be held in close heat-conducting operative engagement with the outer surface of the tank 21.

It is obvious that if the thickness of the metal of the housing 39 is on the order of .015" and if the thickness of the anodic coating is less than $1/1000$ of an inch, the length of heat-flow path from the resistance conductor 41, 51 or 53 to the surface of the tank will be relatively very small and if the housing 39 is made of aluminum, the thermal reluctance of the heat-flow path is relatively very small and even where a convoluted resistance conductor such as 51 is used, the distribution of the heat through the housing will be such as to make it substantially uniform throughout the entire area of the housing and particularly of the main heat-flow conducting path through the bent-over edges 43.

It is obvious that the thermal mass of my heating unit is relatively very small, that the electric-insulating coating or layer between the conductor and the tank is integral with one or both of the elements comprising the heating unit and that the method of removal of a damaged heating unit and the insertion of a new heating unit can be effected easily and quickly without the use of any special tools.

Various modifications may be made in the structures embodying my invention without departing from the spirit and scope thereof and all such modifications clearly coming within the scope of the appended claims are to be considered a part thereof.

I claim as my invention:

1. An electric heater to be mounted against the outside surface of a hot water tank, comprising a thin-metal sheath member of flat channel shape, a flat convoluted single layer metallic resistance conductor within the sheath operatively engaging the mid-portion and the bent-over edge portion of the sheath, the resistance conductor having an inorganic, integral, heat-conducting, high temperature-resisting and electric-insulating coating on its surface and mechanical means connecting the two end parts of the mid portion of said sheath to tightly clamp the sheath around a tank.

2. An electric heater unit adapted to be mounted on the outside surface of a hot water tank, comprising a thin-metal sheath member of flat channel-shape, a flat convoluted single layer metallic resistance conductor within the sheath member operatively engaging the mid portion and the bent-over edge portion of the sheath, the engaging surfaces of the sheath and of the resistance conductor having thereon an integral, inorganic, heat-conducting, high temperature-resisting and electric-insulating coating and mechanical means connecting the two end parts of the mid portion of said sheath to tightly clamp the sheath around a tank with the bent-over edge portions of the sheath adjacent to and in close operative engagement with the tank.

3. An electric heater unit adapted to be mounted on the outside surface of a hot water tank, comprising a thin-metal sheath member of flat channel-shape having a closely adjacent mid portion and laterally return-bent edge portions, the adjacent surfaces of the mid portion and of the edge portions having thereon an inorganic, integral, heat-conducting, high temperature-resisting and electric-insulating coating, a single layer, flat convoluted resistance conductor between the mid portion and an edge portion of said sheath and mechanical clamping means connected to the two end parts of the mid portion of said sheath to tightly clamp the sheath around a tank with the bent-over edge portions adjacent to and in close operative engagement with the tank and the mid portion of the sheath in close operative engagement with said resistance conductor and the resistance conductor in close operative engagement with an edge portion.

4. An electric heater unit of the kind set forth in claim 3 and in which the resistance conductor has thereon an inorganic, integral, heat-conducting, high temperature-resisting and electric-insulating coating.

CLARK M. OSTERHELD.